United States Patent [19]
Yang

[11] Patent Number: 5,800,047
[45] Date of Patent: Sep. 1, 1998

[54] STRUCTURE OF DECORATING LIGHT STRING'S LIGHT BULB

[76] Inventor: Chin Ying Yang, No.38, Lane 1, Alley 620, Chingkuo Road, Sec. 2, Hsinchu, Taiwan

[21] Appl. No.: 703,040

[22] Filed: Aug. 26, 1996

[51] Int. Cl.⁶ .................................................. F21P 1/02
[52] U.S. Cl. ..................... 362/255; 362/806; 313/318.01
[58] Field of Search .............................. 313/318.01, 272; 362/255, 249, 215, 806

[56] References Cited

U.S. PATENT DOCUMENTS

| | | | |
|---|---|---|---|
| 2,136,780 | 11/1938 | Berwick | 362/255 |
| 2,190,283 | 2/1940 | Eckelberg | 362/255 |
| 3,050,619 | 8/1962 | Abramson | 362/255 |
| 5,384,510 | 1/1995 | Arnold | 313/272 |

*Primary Examiner*—Nimeshkumar Patel
*Attorney, Agent, or Firm*—Beveridge, DeGrandi, Weilacher & Young, LLP

[57] ABSTRACT

One improvement of the structure of decorating light string's light bulb. The light bulb has two opposite copper filaments inside. These two copper filaments are linked together at their middle segment, and then fixed at a proper place on the socket of the light bulb. Their bottom segments stretch outside of the bottom, and their upper segments are being withheld inside, of the bulb. On the copper filaments withheld inside of the bulb, multiple places are linked together by tungsten filaments. After the electrical power is supplied, several light spots can be generated.

8 Claims, 5 Drawing Sheets

PRIOR ART

STRUCTURE OF DECORATING LIGHT STRING'S LIGHT BULB

FIELD OF INVENTION

This invention relates to a structure of a decorating light string's light bulbs, and specifically to a light string with light bulbs which can generate multiple light spots.

BACKGROUND OF THE INVENTION

General light strings consist of many light bulbs. Each light bulb contains a tungsten filament which is heated by the current passing through it and generate light spots. To make the light bulbs illuminate light spots with various colors, the outer surface of light bulbs are coated or painted with colors. And to produce more colors of light, different colors are coated or painted with colors. And to produce more colors of light, different colors are coated on the outer surface of light bulbs for more splendid color. If only one color is coated on the surface of one light bulb, then only one color of light can be presented. The more colors of light we want, the more light bulbs we need. When more than one color is coated on the light bulb, different colors can be faintly distinguished before the electrical power is connected. Because of only one light spot, again only one color of light can be presented. This is of no improvement at all. Based on my experiences of manufacturing in the past few years, I have conceived this invention in order to reduce the number of light bulbs needed and also to generate more changes of colors. Such light bulb will find wide uses.

SUMMARY OF THE INVENTION

The primary objective of the present invention is to provide an improvement in the structure of a decorating light string's light bulbs in which the multiple tungsten filaments are connected to copper leads. This structure can generate multiple light spots when electrical power is supplied.

The secondary objective of this invention is to provide an improvement in the structure of a decorating light string's light bulbs in which multiple tungsten filaments are disposed inside each bulb, and the light string that is made by these bulbs therefore will be able to emanate more light spots than a traditional string does. By putting on more colors and decorative articles, these light strings can provide more uses than traditional bulb strings.

Therefore, in order to illustrate the objectives, features and effectiveness of the present invention, I will show you examples, accompanied by attached figures, in the detailed explanation in the following pages.

BRIEF DESCRIPTION OF THE DRAWINGS AND THEIR COMPONENT NUMBERS (A) The Drawings FIG. 1 is a diagram of a traditional decorating light string's light bulb;

(B) The Component Numbers

10 Light bulb

11 Copper leads

12 Tungsten filament

13 Bulb socket (or base)

14 Wire socket

15 Electrical wire

16 Decorating cover

17 Decorative article

20 Light bulb

DETAILED DESCRIPTION OF THE INVENTION

Figure 1:
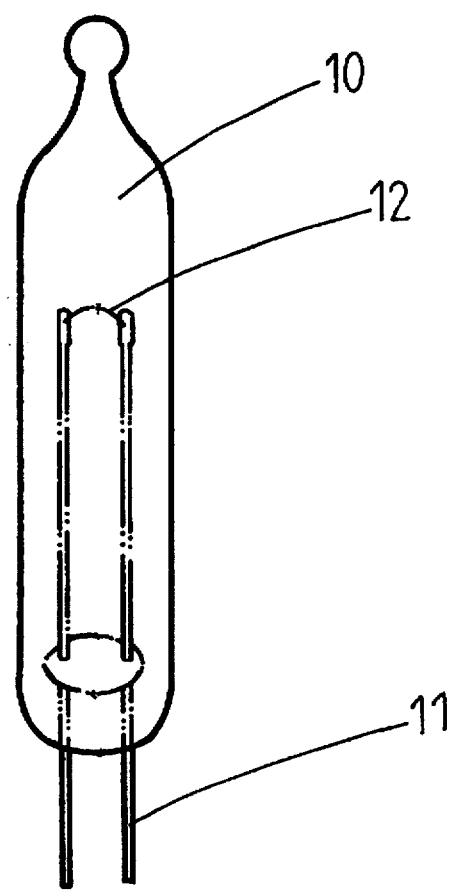

FIG. 1 is the diagram of the traditional decorating light string's light bulb. The upper segments of two copper leads 11 are positioned within a light bulb 10. The middle segment of the leads 11 are fixed at the bottom of light bulb 10 so not to separate from light bulb 10. The lower segment of leads 11 go through the bottom of light bulb 10. A piece of tungsten filament 12 is connected between copper leads 11. When electrical power is on, a light spot will generate where the tungsten filament 12 is jointed with the copper leads 11.

Figure 2:
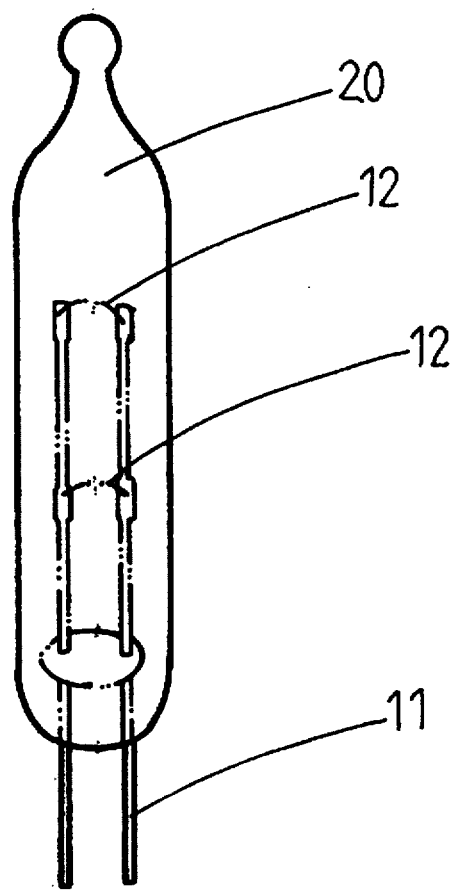
FIG. 2 is a diagram of the outer look of an invented decorating light string's light bulb of the present invention.

FIG. 2 is the diagram of the outer look of the invented decorating light string's light bulb. The upper segments of two copper leads 11 are positioned within a light bulb 20. The middle segment of the leads 11 are fixed at the bottom of light bulb 20. Two pieces of tungsten filaments 12 are connected between copper leads 11 at separate positions within light bulb 20. When electrical power is on, two light spots will generate where the tungsten filament 12 is jointed with copper leads 11.

Figure 3:
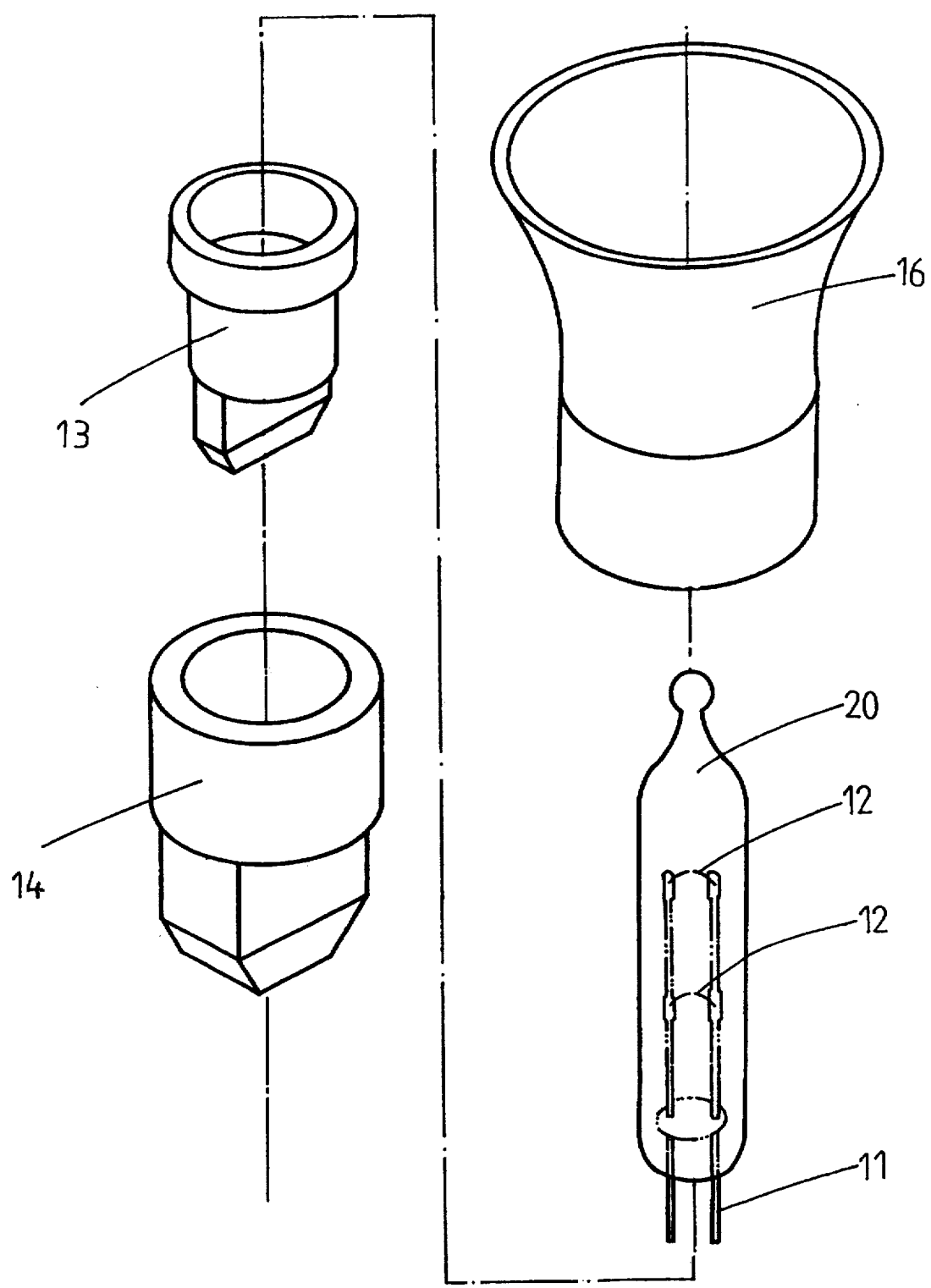
FIG. 3 is an exploded diagram of the structure of the invented decorating light string's light bulb.

FIG. 3 is the exploded diagram of the structure of invented decorating light string's light bulb. Two copper filaments 11 stretch out of light bulb 20, and are placed on the bulb socket 13. Wire socket 14 embracing bulb socket 13 helps fix the copper leads 11. Copper leads 11 are the paths of electrical current.

In addition, a decorating cover 16 can be installed on the outside of light bulb 20. Through the light spots emanated from the light bulb 20, a vague light circle can be formed.

Figure 4:
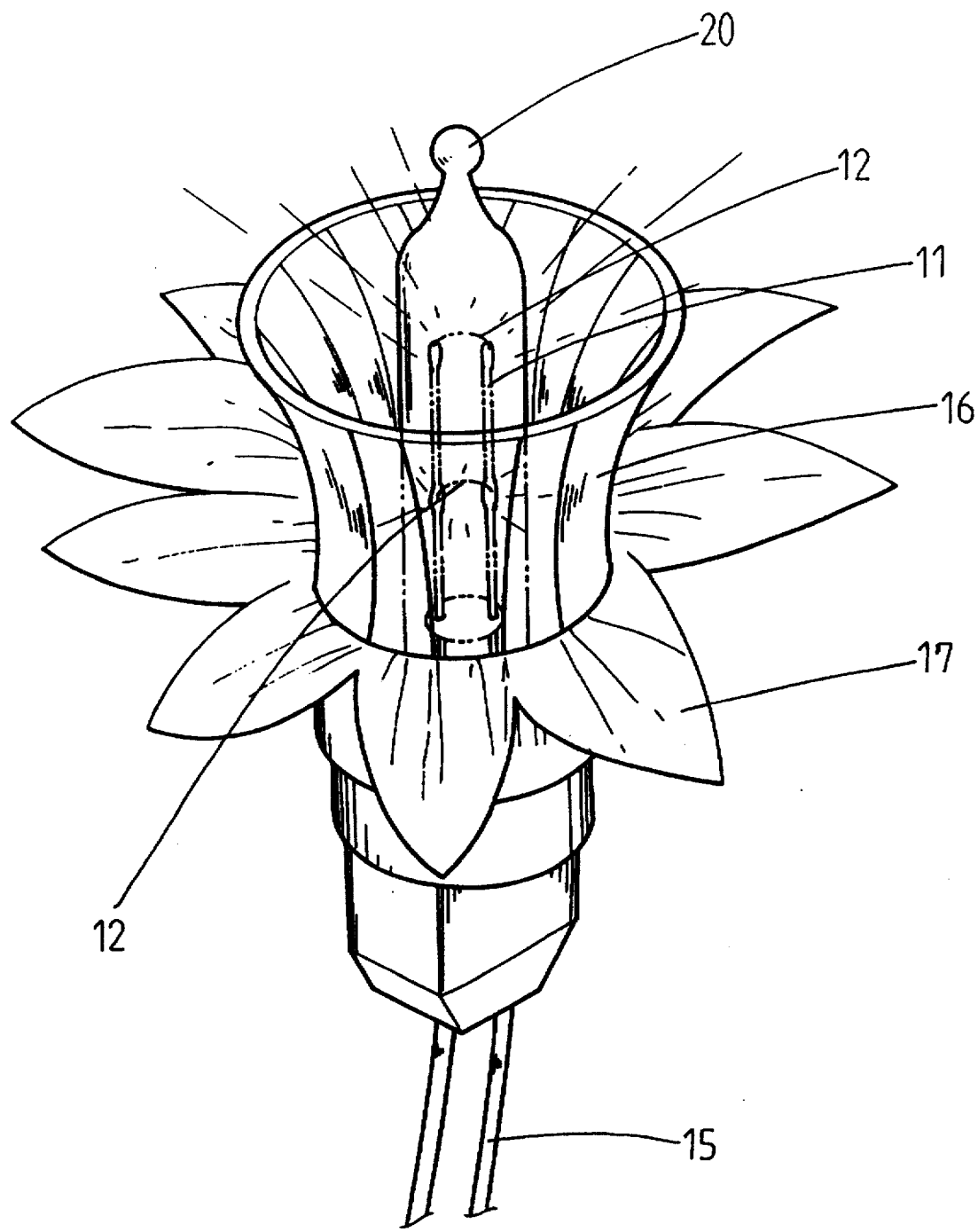
FIG. 4 is another diagram of this invention.
Figure 5:
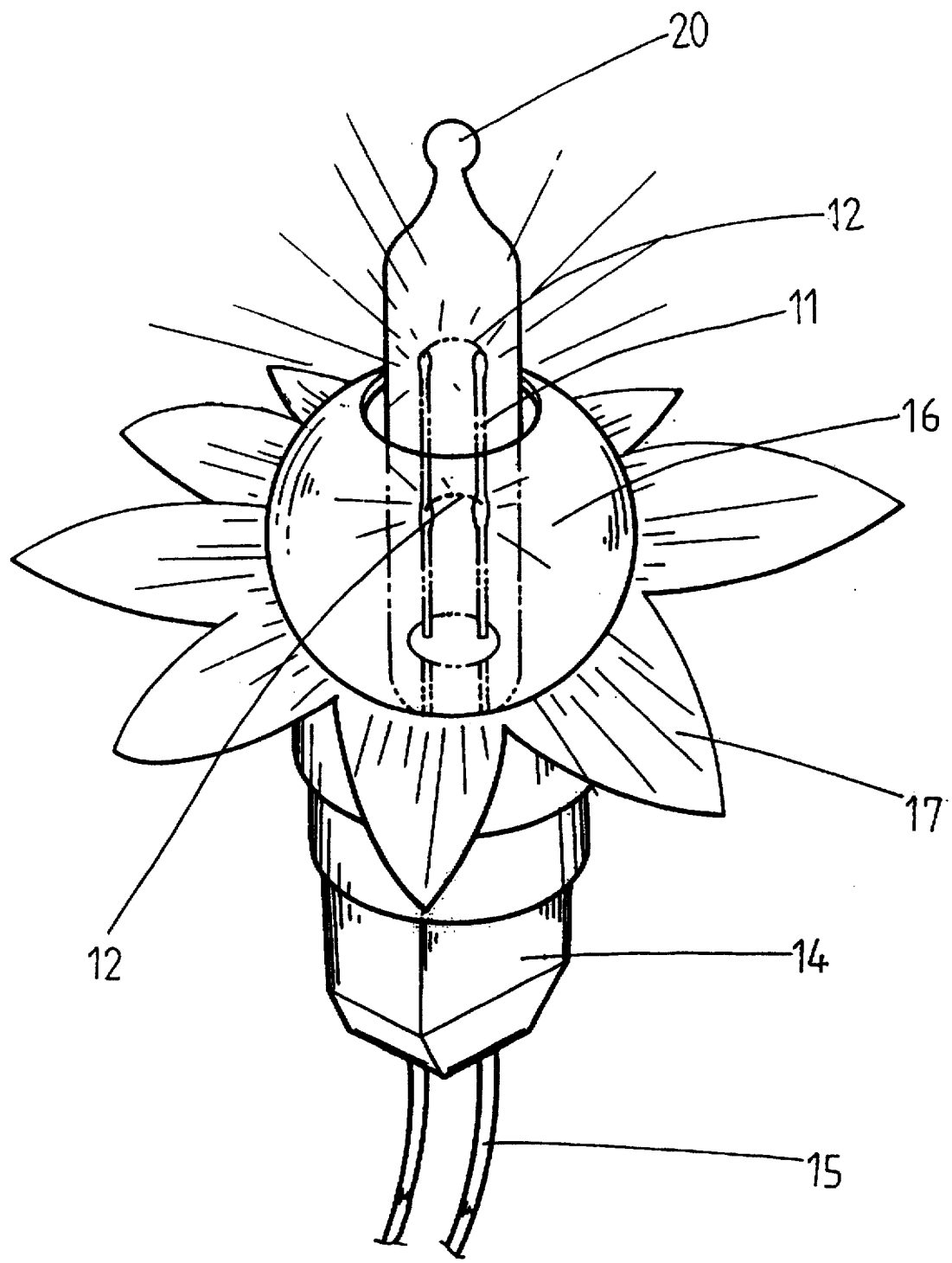
FIG. 5 is yet another diagram of this invention.

FIG. 4 and FIG. 5 show other embodiments of this invention. Various colors are coated according to the consumer's needs on the outer surface of light bulb 20 to produce various light spots with different color circles. If we put a decorating cover 17 around light bulb 20, the position of the cover 17 is such that one of the tungsten filaments 12 is above the cover 17, the other filament 12 is below the cover 17. When electrical power is on the light bulb 20 can produce two different light spots. If we put a different decorating cover 17 when the power is on, the light bulb 20 can make its light circle spread on the wall and present a different vision. When we assemble a number of light bulbs 20 to a light string, it will emanate two times as many light spots as the original light string. For example, if a light string contains 50 different light bulbs 20, it will emanate 100 light spots. With various shapes and colors of decorating cover 17, the light string can present a multi-style pattern.

It will thus be seen that this invention, is both practical and useful. The number of light spots produced by light bulb 20, to meet various needs, can be determined by the number of tungsten filaments.

Above mentioned are only some preferred embodiments of this invention. Hence, they should not put any limit on the scope of applications of this invention. Other changes and modifications based on this invention should still be considered covered by the scope of this invention.

What is claimed is:

1. A light emitting apparatus, comprising:

a bulb;

a pair of leads each having at least a portion thereof disposed in said bulb;

a first filament connected between said leads and disposed in said bulb;

a second filament connected between said leads and disposed in said bulb; and a decorative cover disposed about said bulb wherein, said decorative cover has a terminal rim, said first filament is positioned above said terminal rim, and said second filament is positioned below said terminal rim.

2. The light emitting apparatus defined by claim 1, wherein:

said first and said second filaments simultaneously illuminate when said leads are connected to a power source.

3. The light emitting apparatus defined by claim 2, wherein:

said first and said second filaments generate first and second light spots, respectively, when connected to a power source.

4. The light emitting apparatus defined by claim 2, wherein:

said first filament is spatially disposed from said second filament.

5. The light emitting apparatus defined by claim 1, further comprising:

a decorative article disposed about said decorative cover.

6. The light emitting apparatus defined by claim 5, further comprising:

an electrical cord having two wires, each of said two wires being respectively connected to one of said leads.

7. The light emitting apparatus defined by claim 6, wherein, said leads are formed of copper.

8. The light emitting apparatus defined by claim 7, wherein, said first and said second filaments are each formed of tungsten.

* * * * *